US012646891B2

(12) United States Patent
Yang et al.

(10) Patent No.: US 12,646,891 B2
(45) Date of Patent: Jun. 2, 2026

(54) BATTERY PACK AND MANUAL SERVICE DISCONNECT THEREOF, BATTERY PROTECTION METHOD

(71) Applicant: AESC Japan Ltd., Kanagawa (JP)

(72) Inventors: Mingping Yang, Shanghai (CN); Yafei He, Shanghai (CN)

(73) Assignee: AESC Japan Ltd., Kanagawa (JP)

( * ) Notice: Subject to any disclaimer, the term of this patent is extended or adjusted under 35 U.S.C. 154(b) by 335 days.

(21) Appl. No.: 18/510,650

(22) Filed: Nov. 16, 2023

(65) Prior Publication Data

US 2024/0313479 A1 Sep. 19, 2024

(30) Foreign Application Priority Data

Mar. 13, 2023 (CN) .......................... 202310234374.9

(51) Int. Cl.
*H01R 13/648* (2006.01)
*H01M 10/42* (2006.01)
*H01M 50/588* (2021.01)

(52) U.S. Cl.
CPC ...... *H01R 13/6485* (2013.01); *H01M 10/425* (2013.01); *H01M 50/588* (2021.01); *H01M 2010/4271* (2013.01)

(58) Field of Classification Search
CPC ............ H01R 13/6485; H01R 2201/26; H01R 31/08; H01M 10/425; H01M 50/588;
(Continued)

(56) References Cited

U.S. PATENT DOCUMENTS 10,511,005 B2 * 12/2019 Lee ........................ H01M 50/50
11,476,060 B1 * 10/2022 Chang .................... B60R 16/02
(Continued)

FOREIGN PATENT DOCUMENTS

CN 104300597 8/2016
EP 2672573 12/2013
(Continued)

OTHER PUBLICATIONS

"Office Action of Japan Counterpart Application", issued on Jan. 30, 2025, with English translation thereof, p. 1-p. 14.
(Continued)

*Primary Examiner* — Abdullah A Riyami
*Assistant Examiner* — Nader J Alhawamdeh
(74) *Attorney, Agent, or Firm* — JCIPRNET

(57) ABSTRACT

A battery pack, a manual service disconnect thereof, and a battery protection method are provided. The manual service disconnect includes a base assembly and an upper cover assembly. The base assembly includes a base body, two first high-voltage terminals that are insulated and fixed on the base body, and two second high-voltage terminals that are insulated and fixed on the base body. The upper cover assembly includes an upper cover body and two third high-voltage terminals fixed on the upper cover body and corresponding to the two first high-voltage terminals, and two fourth high-voltage terminals fixed on the upper cover body and corresponding to the two second high-voltage terminals. The two third high-voltage terminals are electrically connected, and the two fourth high-voltage terminals are electrically connected.

16 Claims, 8 Drawing Sheets

(58) Field of Classification Search
CPC ....... H01M 2010/4271; H01M 50/296; H01M
50/574; H01M 10/42; B60L 3/0046;
B60L 3/0069; B60L 53/16; B60L 58/10;
B60L 3/04; H02J 7/0031; Y02E 60/10;
H01H 1/58; H01H 9/02; H01H 9/22
See application file for complete search history.

(56) References Cited

U.S. PATENT DOCUMENTS

| | | | |
|---|---|---|---|
| 2017/0201161 A1 | 7/2017 | Geiler et al. | |
| 2018/0083237 A1 | 3/2018 | Wang et al. | |
| 2018/0205058 A1* | 7/2018 | Lee ....................... | H01M 50/50 |
| 2022/0278414 A1* | 9/2022 | Römelsberger ..... | H01M 50/296 |
| 2024/0258628 A1* | 8/2024 | Milanovic ........... | H01M 50/209 |
| 2024/0313479 A1* | 9/2024 | Yang .................... | B60L 3/0069 |

FOREIGN PATENT DOCUMENTS

| | | |
|---|---|---|
| JP | 2000082549 | 3/2000 |
| JP | 3948499 | 7/2007 |
| JP | 3948499 B2 * | 7/2007 |

OTHER PUBLICATIONS

"Search Report of Europe Counterpart Application", issued on Apr. 22, 2024, p. 1-p. 9.

* cited by examiner

BATTERY PACK AND MANUAL SERVICE DISCONNECT THEREOF, BATTERY PROTECTION METHOD

CROSS-REFERENCE TO RELATED APPLICATION

This application claims the priority benefit of China application serial no. 202310234374.9, filed on Mar. 13, 2023. The entirety of the above-mentioned patent application is hereby incorporated by reference herein and made a part of this specification.

BACKGROUND

Technical Field

The present disclosure relates to the technical field of battery control, in particular to a battery pack, a manual service disconnect thereof, and a battery protection method.

Description of Related Art

Electric shock protection for electric vehicles is achieved by adding a manual service disconnect (hereinafter referred to as MSD) near the positive or negative electrode of the battery, as shown in FIG. 1, where 1 and 2 are two high-voltage terminals on a base assembly. During installation and maintenance, an operator unplugs the MSD, and the upper cover assembly of the MSD is separated from the base assembly, so that the two high-voltage terminals (1, 2) on the base assembly are disconnected from the two high-voltage terminals of the upper cover assembly. Therefore, it is possible to achieve the function of disconnecting the high-voltage loop and prevent the operator from getting an electric shock.

However, the disadvantage of the related art is that when the upper cover assembly of the MSD is separated from the base assembly, only one electrode of the battery pack may be disconnected, such as the negative electrode shown in FIG. 2. When there is a connection between the negative electrode of the battery pack and the battery case (as the dashed line shown in FIG. 2) and when the insulation is abnormal, there will still be a potential difference between the positive and negative electrodes of the battery pack, and the operator will be at risk of electric shock.

SUMMARY

The technical problem to be solved in this disclosure is to provide a battery pack, a manual service disconnect (MSD) thereof, and a battery protection method in order to overcome the defect of manual service disconnect in related art that there is still a risk of electric shock even if the battery is detached.

The disclosure solves the above-mentioned technical problems through the following technical solutions.

In a first aspect, the present disclosure provides a manual service disconnect, and the manual service disconnect includes a base assembly and an upper cover assembly. The base assembly includes a base body, two first high-voltage terminals that are insulated and fixed on the base body, and two second high-voltage terminals that are insulated and fixed on the base body. The upper cover assembly includes an upper cover body and two third high-voltage terminals fixed on the upper cover body and corresponding to the two first high-voltage terminals, and two fourth high-voltage terminals fixed on the upper cover body and corresponding to the two second high-voltage terminals. The two third high-voltage terminals are electrically connected, and the two fourth high-voltage terminals are electrically connected. When the upper cover assembly is engaged with the base assembly, the two first high-voltage terminals are electrically connected through the two third high-voltage terminals, and the two second high-voltage terminals are electrically connected through the two fourth high-voltage terminals.

Preferably, the base assembly further includes two first interlocking terminals that are insulated and fixed on the base body. The upper cover assembly further includes two second interlocking terminals fixed on the upper cover body and corresponding to the two first interlocking terminals, and the two second interlocking terminals are electrically connected. When the upper cover assembly is engaged with the base assembly, the two first interlocking terminals are electrically connected through the two second interlocking terminals.

Preferably, the sum of the lengths of the first interlocking terminal and the second interlocking terminal is less than the sum of the lengths of the first high-voltage terminal and the third high-voltage terminal; and/or the sum of the lengths of the first interlocking terminal and the second interlocking terminal is less than the sum of the lengths of the second high-voltage terminal and the fourth high-voltage terminal.

Preferably, the two first high-voltage terminals are parallel to each other, the two second high-voltage terminals are parallel to each other, the two third high-voltage terminals are parallel to each other, and the two fourth high-voltage terminals are parallel to each other; and/or the two first interlocking terminals are parallel to each other, and the two second interlocking terminals are parallel to each other.

Preferably, one of the two first high-voltage terminals and one of the two second high-voltage terminals are parallel to each other; the other of the two first high-voltage terminals and the other of the two second high-voltage terminals are parallel to each other; and/or one of the two third high-voltage terminals and one of the two fourth high-voltage terminals are parallel to each other; the other of the two third high-voltage terminals and the other of the two fourth high-voltage terminals are parallel to each other.

Preferably, the base assembly further includes at least two first low-voltage terminals that are insulated and fixed on the base body. The upper cover assembly also includes two second low-voltage terminals fixed on the upper cover body and corresponding to the two first low-voltage terminals, and the two second low-voltage terminals are electrically connected. When the upper cover assembly is engaged with the base assembly, the two first low-voltage terminals are electrically connected through the two second low-voltage terminals.

Preferably, the sum of the lengths of the first interlocking terminal and the second interlocking terminal is less than the sum of the lengths of the first low-voltage terminal and the second low-voltage terminal; and/or the sum of the lengths of the first low-voltage terminal and the second low-voltage terminal is less than the sum of the lengths of the first high-voltage terminal and the third high-voltage terminal; and/or the sum of the lengths of the first low-voltage terminal and the second low-voltage terminal is less than the sum of the lengths of the second high-voltage terminal and the fourth high-voltage terminal.

In a second aspect, the present disclosure provides a battery pack, and the battery pack includes a battery unit. The battery unit includes a high-voltage positive electrode and a high-voltage negative electrode, the high-voltage positive electrode is connected to a high-voltage positive circuit, and the high-voltage negative electrode is connected to a high-voltage negative circuit. The battery pack includes a manual service disconnect as described above, one of the two first high-voltage terminals is connected to the high-voltage positive electrode, and one of the two second high-voltage terminals is connected to the high-voltage negative electrode. When the upper cover assembly is engaged with the base assembly, the two first high-voltage terminals are electrically connected through the two third high-voltage terminals to conduct the high-voltage positive circuit, and the two second high-voltage terminals are electrically connected through the two fourth high-voltage terminals to conduct the high-voltage negative circuit to form a high-voltage loop. When the upper cover assembly is separated from the base assembly, the high-voltage positive circuit is disconnected and the high-voltage negative circuit is disconnected.

Preferably, the battery pack further includes a battery management system, and the two first interlocking terminals are connected to the battery management system. When the upper cover assembly is engaged with the base assembly, the two first interlocking terminals are electrically connected through the two second interlocking terminals to form a high-voltage interlocking loop. When the upper cover assembly is separated from the base assembly, the high-voltage interlocking loop is disconnected.

Preferably, when the upper cover assembly is engaged with the base assembly, the two first low-voltage terminals are electrically connected through the two second low-voltage terminals to form a low-voltage power supply loop; the low-voltage power supply loop is configured to supply power to a switching device to close the switching device; the switching device is arranged on the high-voltage loop. When the upper cover assembly is separated from the base assembly, the low-voltage power supply loop is disconnected to trigger disconnection of the high-voltage loop.

Preferably, the low-voltage power supply loop is a KL30 loop or a KL31 loop.

In a third aspect, the present disclosure provides a battery protection method, which is applied to the above-mentioned battery pack, and the battery protection method includes: when the upper cover assembly is separated from the base assembly, the high-voltage positive circuit is disconnected and the high-voltage negative circuit is disconnected.

Preferably, following the step of separating the upper cover assembly from the base assembly, before the step of disconnecting the high-voltage positive circuit and disconnecting the high-voltage negative circuit, the method further includes: the high-voltage interlocking loop is disconnected, and the battery management system is triggered to generate a high-voltage control signal, and the high-voltage control signal is provided to control the disconnection of the high-voltage loop.

Preferably, following the step of separating the upper cover assembly from the base assembly, and before the step of disconnecting the high-voltage positive circuit and disconnecting the high-voltage negative circuit, the method further includes: the low-voltage power supply loop is disconnected to stop supplying power to the switching device and/or the battery management system so as to disconnect the high-voltage loop.

On the basis of conforming to common knowledge in the field, the above-mentioned preferred conditions may be combined freely to obtain the preferred examples of the present disclosure.

The positive progress achieved by the disclosure is: the manual service disconnect of this disclosure has a total of four levels of high-voltage terminals on the base assembly and the upper cover assembly. When the upper cover assembly is engaged with the base assembly, the manual service disconnect put into use makes the positive and negative electrodes of the battery connect to the high-voltage positive and negative circuits respectively to form a high-voltage loop. When the upper cover assembly is disconnected from the base assembly, the manual service disconnect may simultaneously disconnect the positive and negative electrodes of the battery from the high-voltage positive and negative circuits, so that even if there is abnormal insulation between the positive and negative electrodes of the battery and the battery case, it is impossible to form a high-voltage loop, which reduces the risk of electric shock for operators and improves safety.

DESCRIPTION OF THE EMBODIMENTS

The present disclosure will be further described below by means of examples, but the present disclosure is not limited to the scope of the examples.

Embodiment 1

Figure 3:
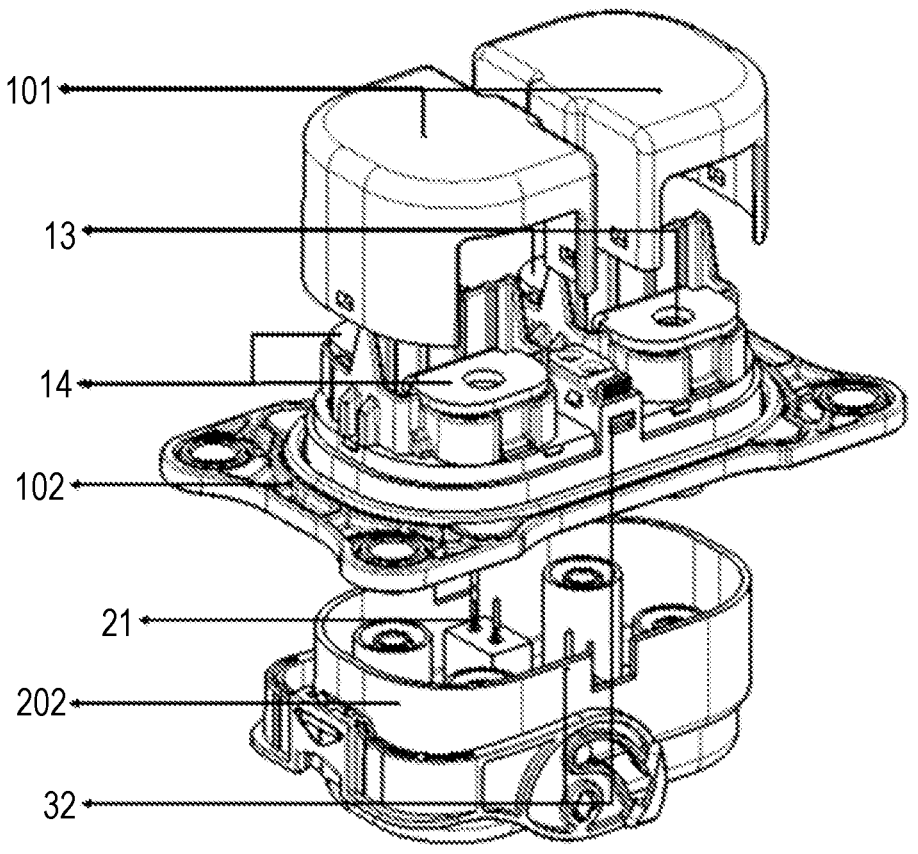
FIG. 3 is a first structural diagram of a manual service disconnect in Embodiment 1 of the present disclosure.
Figure 4:
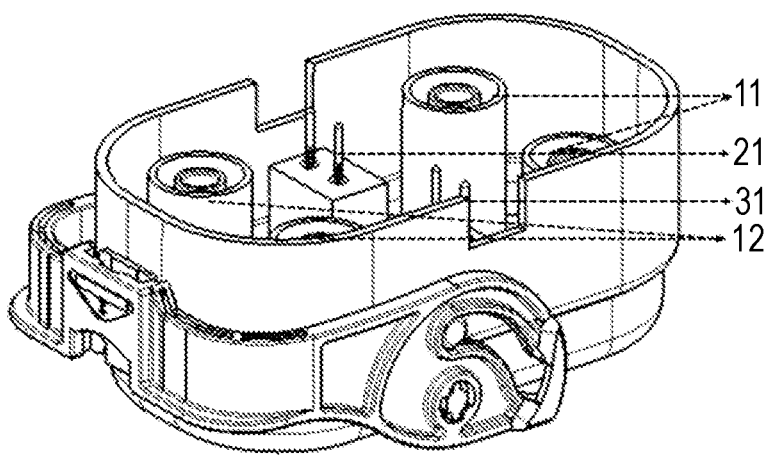
FIG. 4 is a second structural diagram of a manual service disconnect in Embodiment 1 of the present disclosure.

This embodiment provides a manual service disconnect. Referring to FIG. 3 and FIG. 4, the manual service disconnect includes a base assembly and an upper cover assembly. The cover assembly includes an upper cover 101 and an upper cover body 102. The upper cover body 102 is arranged corresponding to a base body 202.

The base assembly includes a base body 202, two first high-voltage terminals 11 insulated and fixed on the base body 202, and two second high-voltage terminals 12 insulated and fixed on the base body 202.

The upper cover assembly includes an upper cover body 102 and two third high-voltage terminals 13 fixed on the upper cover body 102 and corresponding to the two first high-voltage terminals 11, and two fourth high-voltage terminals 14 fixed on the upper cover body 102 and corresponding to the two second high-voltage terminals 12. The two third high-voltage terminals 13 are electrically connected, and the two fourth high-voltage terminals 14 are electrically connected.

When the upper cover assembly is engaged with the base assembly, the two first high-voltage terminals 11 are electrically connected through the two third high-voltage terminals 13, and the two second high-voltage terminals 12 are electrically connected through the two fourth high-voltage terminals 14.

In this embodiment, the manual service disconnect has a total of four levels of high-voltage terminals on the base assembly and the upper cover assembly. When put into use, the high-voltage positive electrode of the battery unit is connected to the high-voltage positive circuit through the first high-voltage terminal 11 and the third high-voltage terminal 13. The high-voltage negative electrode of the battery unit is connected to the high-voltage negative circuit through the second high-voltage terminal 12 and the fourth high-voltage terminal 14. When the upper cover assembly is engaged with the base assembly, the manual service disconnect may simultaneously connect the high-voltage positive and negative electrodes of the battery unit. When the upper cover assembly is disconnected from the base assembly, the manual service disconnect may disconnect the high-voltage positive and negative electrodes of the battery unit simultaneously, thus avoiding abnormal insulation between the high-voltage negative electrode of the battery pack and the battery case (the dashed line in FIG. 2 indicates the battery box), thereby improving the safety of disassembly of battery pack and maintenance of high-voltage loop.

Figure 1:
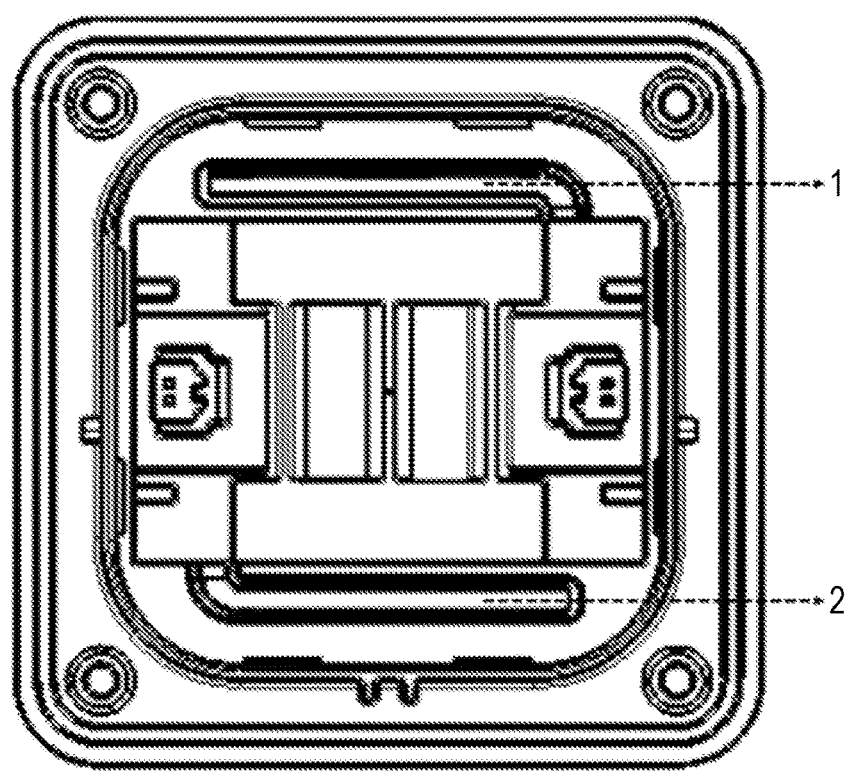
FIG. 1 is a schematic structural diagram of a unidirectional manual service disconnect in the related art.
Figure 2:
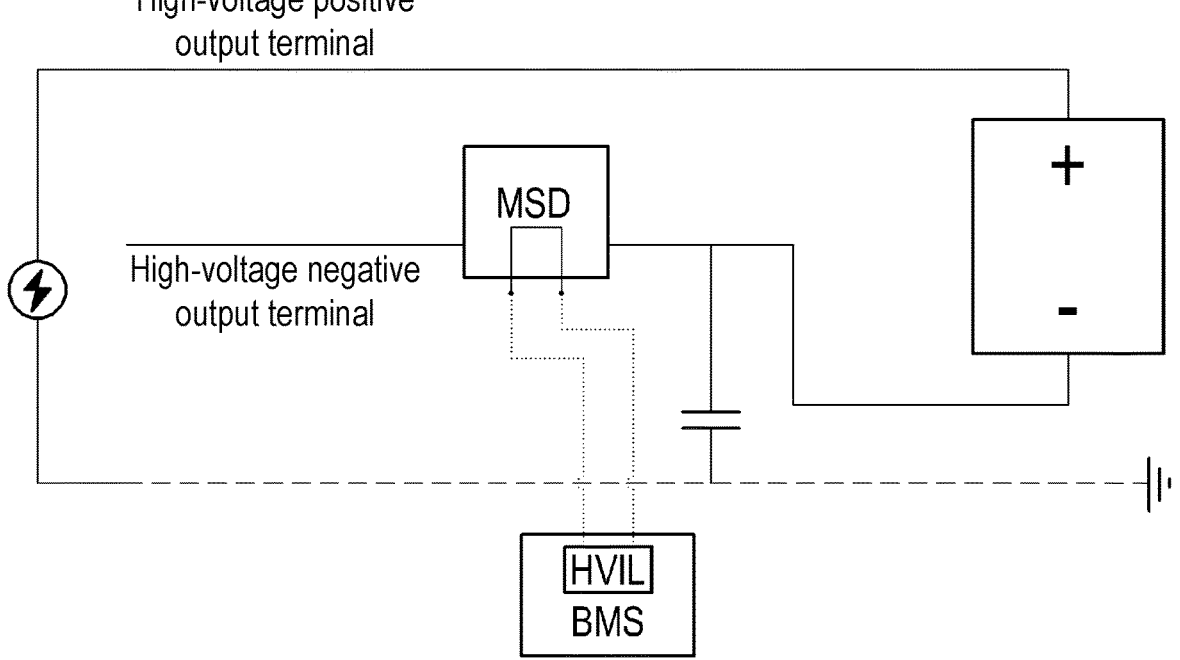
FIG. 2 is a schematic diagram of a protection circuit of a unidirectional manual service disconnect in the related art.

The so-called insulation abnormality means that when one electrode of the battery pack is disconnected, taking the disconnection of the high-voltage negative electrode shown in FIG. 2 as an example, the electrical connection of the two high-voltage terminals (1, 2) shown in FIG. 1 is disconnected from the high-voltage negative electrode, but there is still communication between the high-voltage negative electrode of the battery pack and the battery case, so that there is a potential difference between the positive electrode and the negative electrode of the battery pack.

For the manual service disconnect provided in this embodiment, when the upper cover assembly is separated from the base assembly, the high-voltage positive circuit and the high-voltage negative circuit are simultaneously disconnected, so as to avoid abnormal insulation between the high-voltage positive and negative electrodes of the battery pack and the battery case. In this way, it is possible to further effectively reduce the electric shock risk of operators during maintenance, and improve the safety of operators during maintenance.

In some optional embodiments, referring to FIG. 4, the base assembly further includes two first interlocking terminals 21 which are insulated and fixed on the base body 202.

The upper cover assembly further includes two second interlocking terminals 22 (see FIG. 5) fixed on the upper cover body 102 and corresponding to the two first interlocking terminals 21. The two second interlocking terminals 22 are electrically connected.

When the upper cover assembly is engaged with the base assembly, the two first interlocking terminals 21 are electrically connected through the two second interlocking terminals 22.

In this embodiment, when the upper cover assembly is engaged with the base assembly, the manual service disconnect including the first interlocking terminal 21 and the second interlocking terminal 22 may form a high-voltage interlocking loop with the battery management system (BMS) circuit. When the upper cover assembly is disconnected from the base assembly, the high-voltage interlocking loop is disconnected, the battery management system generates a high-voltage control signal, and the high-voltage control signal is configured to control and disconnect the power supply of switching devices such as relays, so that switching devices such as relays are disconnected to disconnect the high-voltage loop including switching devices such as relays, so as to further prevent electric shock and improve safety.

In some optional embodiments, the sum of the lengths of the first interlocking terminal 21 and the second interlocking terminal 22 is less than the sum of the lengths of the first high-voltage terminal 11 and the third high-voltage terminal 13.

In some optional embodiments, the length of each first interlocking terminal 21 is less than the length of each first high-voltage terminal 11, and the length of each second interlocking terminal 22 is equal to the length of each third high-voltage terminal 13, so that the sum of the lengths of the first interlocking terminal 21 and the second interlocking terminal 22 is less than the sum of the lengths of the first high-voltage terminal 11 and the third high-voltage terminal 13. The length difference D between the first interlocking terminal 21 and the first high-voltage terminal 11 may be, but not limited to, greater than or equal to 1 mm.

In some optional embodiments, the length of each second interlocking terminal 22 is less than the length of each third high-voltage terminal 13, and the length of each first interlocking terminal 21 is equal to the length of each first high-voltage terminal 11, so that the sum of the lengths of the first interlocking terminal 21 and the second interlocking terminal 22 is less than the sum of the lengths of the first high-voltage terminal 11 and the third high-voltage terminal 13. The length difference D between the first interlocking terminal 21 and the third high-voltage terminal 13 may be, but not limited to, greater than or equal to 1 mm.

In some optional embodiments, the length of each first interlocking terminal 21 is shorter than the length of each first high-voltage terminal 11, and the length of each second interlocking terminal 22 is shorter than that of each third high-voltage terminal 13, so that the sum of the lengths of the first interlocking terminal 21 and the second interlocking terminal 22 is less than the sum of the lengths of the first high-voltage terminal 11 and the third high-voltage terminal 13. In this embodiment, when the manual service disconnect is turned on, that is, when the upper cover assembly is engaged with the base assembly, the high-voltage positive circuit is connected first, and then the high-voltage interlocking loop is connected, that is, the high-voltage loop will be connected before the high-voltage interlocking loop, and controllers such as the battery management system disposed on the high-voltage interlocking loop will then power on the loads such as electrical devices on the high-voltage loop, thereby ensuring the safety of use of electricity.

When the manual service disconnect is disconnected, that is, when the upper cover assembly is disconnected from the base assembly, the high-voltage interlocking loop may be disconnected first, and then the high-voltage positive circuit is disconnected, that is, the high-voltage loop will be disconnected later than the high-voltage interlocking loop, and controllers such as a battery management systems disposed on the high-voltage interlocking loop will cut off power before loads such as electrical components on the high-voltage loop.

The high-voltage interlocking loop may be used to detect the connection status of the high-voltage loop, and identify whether the loads such as electrical components on the high-voltage loop are not connected or accidentally disconnected. When the upper cover assembly of the manual service disconnect is engaged with the base assembly, the first high-voltage terminal 11 and the third high-voltage terminal 13 are in contact prior to the first interlocking terminal 21 and the second interlocking terminal 22, and the high-voltage loop will be connected prior to the high-voltage interlocking loop, so that the high-voltage interlocking loop may detect whether the high-voltage loop is connected intact. When the upper cover assembly of the manual service disconnect is separated from the base assembly, the first high-voltage terminal 11 and the third high-voltage terminal 13 are disconnected later than the first interlocking terminal 21 and the second interlocking terminal 22, and the high-voltage loop will be disconnected later than the high-voltage interlocking loop. In this way, the high-voltage interlocking loop is disconnected first, which may first trigger the battery management system to generate a high-voltage control signal, and control the disconnection of the relay, so that the high-voltage loop is disconnected. The current in the high-voltage loop is 0 or almost 0, ensuring that the first high-voltage terminal 11 and the third high-voltage terminal 13 are disconnected without electricity, that is, the upper cover assembly and the base assembly are separated without high-voltage electricity, thereby effectively reducing the risk of electric shock of the operator during maintenance and improving the safety of the operator during maintenance. Even if the battery management system fails, after the high-voltage interlocking loop is disconnected, the high-voltage terminals will be disconnected, so that the high-voltage loop will be directly disconnected, thereby preventing maintenance personnel from electric shock, further improving safety, and reinforcing safety of maintenance personnel.

In some optional embodiments, the sum of the lengths of the first interlocking terminal 21 and the second interlocking terminal 22 is less than the sum of the lengths of the second high-voltage terminal 12 and the fourth high-voltage terminal 14.

In some optional embodiments, the length of each first interlocking terminal 21 is less than the length of each second high-voltage terminal 12, and the length of each second interlocking terminal 22 is equal to the length of each fourth high-voltage terminal 14, so that the sum of the lengths of the first interlocking terminal 21 and the second interlocking terminal 22 is less than the sum of the lengths of the second high-voltage terminal 12 and the fourth high-voltage terminal 14. The length difference D between the first interlocking terminal 21 and the second high voltage terminal 12 may be, but not limited to, greater than or equal to 1 mm.

In an optional embodiment, the length of each second interlocking terminal 22 is less than the length of each fourth high-voltage terminal 14, and the length of each first interlocking terminal 21 is equal to the length of each second high-voltage terminal 12, so that the sum of the lengths of the first interlocking terminal 21 and the second interlocking terminal 22 is less than the sum of the lengths of the second high-voltage terminal 12 and the fourth high-voltage terminal 14. The length difference D between the second interlocking terminal 22 and the fourth high-voltage terminal 14 may be, but not limited to, greater than or equal to 1 mm.

In some optional embodiments, the length of each first interlocking terminal 21 is less than the length of each second high-voltage terminal 12, and the length of each second interlocking terminal 22 is less than that of each fourth high-voltage terminal 14, so that the sum of the lengths of the first interlocking terminal 21 and the second interlocking terminal 22 is less than the sum of the lengths of the second high-voltage terminal 12 and the fourth high-voltage terminal 14.

In this embodiment, when the upper cover assembly is connected to the base assembly, the high-voltage negative circuit is connected first, and then the high-voltage interlocking loop is connected, that is, the high-voltage loop will be connected before the high-voltage interlocking loop, and controllers such as the battery management system arranged on the high-voltage interlocking loop will energize the loads such as electrical devices on the high-voltage loop, so as to ensure safety of use of electricity. When the upper cover assembly is disconnected from the base assembly, the high-voltage interlocking loop may be disconnected first, and then the high-voltage negative loop is disconnected, that is, the high-voltage loop is disconnected later than the high-voltage interlocking loop, and controllers such as the battery management system disposed on the high-voltage interlocking loop will cut off power before the loads such as electrical devices on the high-voltage loop.

The high-voltage interlocking loop may be used to detect the connection status of the high-voltage loop, and identify whether the loads such as electrical components on the high-voltage loop are not connected or accidentally disconnected. When the upper cover assembly of the manual service disconnect is engaged with the base assembly, the second high-voltage terminal 12 and the fourth high-voltage terminal 14 are in contact prior to the first interlocking terminal 21 and the second interlocking terminal 22, and the high-voltage loop will be connected prior to the high-voltage interlocking loop, so that the high-voltage interlocking loop may detect whether the high-voltage loop is connected intact. When the upper cover assembly of the manual service disconnect is separated from the base assembly, the second high-voltage terminal 12 and the fourth high-voltage terminal 14 are disconnected later than the first interlocking terminal 21 and the second interlocking terminal 22, and the high-voltage loop will be disconnected later than high-voltage interlocking loop, so that the high-voltage interlocking loop is disconnected first, which may first trigger the battery management system to generate a high-voltage control signal, and control the disconnection of the high-voltage loop. The current in the high-voltage loop is 0 or almost 0 to ensure that the second high-voltage terminal 12 and the fourth high-voltage terminal 14 are disconnected without electricity, that is, the upper cover assembly and the base assembly are separated without high-voltage electricity, thereby effectively reducing the risk of electric shock of the operator during maintenance, and improving operator's safety during maintenance. Even if the battery management system fails, after the high-voltage interlocking loop is disconnected, the high-voltage terminals will be disconnected, so that the high-voltage loop will be directly disconnected, which may also prevent maintenance personnel from getting electric shock, further improve safety, and reinforcing the safety of the maintenance personnel.

In some optional embodiments, the sum of the lengths of the first interlocking terminal 21 and the second interlocking terminal 22 is less than the sum of the lengths of the first high-voltage terminal 11 and the third high-voltage terminal 13, so that the high-voltage loop will be connected prior to the high-voltage interlocking loop, and then disconnected later than the high-voltage interlocking loop.

In addition, the sum of the lengths of the first interlocking terminal 21 and the second interlocking terminal 22 is also less than the sum of the lengths of the second high-voltage terminal 12 and the fourth high-voltage terminal 14, so that the high-voltage loop is connected faster than the high-voltage interlocking loop, and then disconnected later than the high-voltage interlocking loop.

The length of each first interlocking terminal 21 is less than the length of each first high-voltage terminal 11; or the length of each second interlocking terminal 22 is less than the length of each third high-voltage terminal 13; and the length of each first interlocking terminal 21 is less than the length of each second high-voltage terminal 12; or the length of each second interlocking terminal 22 is less than the length of each fourth high-voltage terminal 14.

In this embodiment, when the upper cover assembly is engaged with the base assembly, the high-voltage positive circuit and the high-voltage negative circuit are first connected, and then connected to the high-voltage interlocking loop, that is, the high-voltage loop is connected prior to the high-voltage interlocking loop.

When the upper cover assembly is disconnected from the base assembly, the high-voltage interlocking loop may be disconnected first, and then the high-voltage positive circuit and the high-voltage negative circuit are disconnected, then controllers such as the battery management system disposed on the high-voltage interlocking loop will cut off loads such as electrical devices on the high-voltage loop.

The high-voltage interlocking loop may be used to detect the connection status of the high-voltage loop, and identify whether the loads such as electrical components on the high-voltage loop are not connected or accidentally disconnected. When the upper cover assembly of the manual service disconnect is engaged with the base assembly, the first high-voltage terminal 11 and the third high-voltage terminal 13, as well as the second high-voltage terminal 12 and the fourth high-voltage terminal 14 are in contact prior to the first interlocking terminal 21 and the second interlocking terminal 22, and the high-voltage loop will be connected before the high-voltage interlocking loop, so that the high-voltage interlocking loop may detect whether the high-voltage loop is connected intact. When the upper cover assembly of the manual service disconnect is separated from the base assembly, the first high-voltage terminal 11 and the third high-voltage terminal 13, as well as the second high-voltage terminal 12 and the fourth high-voltage terminal 14 are disconnected later than the first interlocking terminal 21 and the second interlocking terminal 22, and the high-voltage loop is disconnected later than the high-voltage interlocking loop, so that the high-voltage interlocking loop may be disconnected first to trigger the battery management system to generate a high-voltage control signal, and the high-voltage loop is controlled to be disconnected. The current in the high-voltage loop is 0 or almost 0, ensuring that the first high-voltage terminal 11 and the third high-voltage terminal 13 are disconnected without electricity, and the second high-voltage terminal 12 and the fourth high-voltage terminal 14 are disconnected without electricity, that is, the upper cover assembly and the base assembly are separated without high-voltage electricity, thereby effectively reducing the risk of electric shock for the operator during maintenance and improving the operator's safety during maintenance.

Even if the battery management system fails, after the high-voltage interlocking loop is disconnected, the high-voltage terminals will be disconnected, so that the high-voltage loop will be directly disconnected, thereby preventing maintenance personnel from getting electric shock, further improving safety, and reinforcing the safety of the maintenance personnel.

In some optional embodiments, the two first high-voltage terminals 11 are parallel to each other, the two second high-voltage terminals 12 are parallel to each other, the two third high-voltage terminals 13 are parallel to each other, and the two fourth high-voltage terminals are parallel to each other.

In some optional embodiments, the two first interlocking terminals 21 are parallel to each other, and the two second interlocking terminals 22 are parallel to each other.

In some optional embodiments, the two first high-voltage terminals 11 are parallel to each other, the two second high-voltage terminals 12 are parallel to each other, the two third high-voltage terminals 13 are parallel to each other, the two fourth high-voltage terminals are parallel to each other, the two first interlocking terminals 21 are parallel to each other, and the two second interlocking terminals 22 are parallel to each other.

In some optional embodiments, one of the two first high-voltage terminals 11 and one of the two second high-voltage terminals 12 are parallel to each other. The other of the two first-high voltage terminals 11 and the other of the two second high-voltage terminals 12 are parallel to each other.

In some optional implementation, one of the two third-high voltage terminals 13 and one of the two fourth high-voltage terminals 14 are parallel to each other. The other of the two third-high voltage terminals 13 and the other of the two fourth high-voltage terminals 14 are parallel to each other.

In some optional embodiments, one of the two first high-voltage terminals 11 and one of the two second high-voltage terminals 12 are parallel to each other. The other of the two first high-voltage terminals 11 and the other of the two second high-voltage terminals 12 are parallel to each other, and one of the two third high-voltage terminals 13 and one of the two fourth high-voltage terminals 14 are parallel to each other. The other of the two third high-voltage terminals 13 and the other of the two fourth high-voltage terminals 14 are parallel to each other.

In this embodiment, terminals parallel to each other are arranged in the manual service disconnect, which effectively reduces the cost of assembling and manufacturing the manual service disconnect, and improves the efficiency of assembling and manufacturing.

Figure 6:
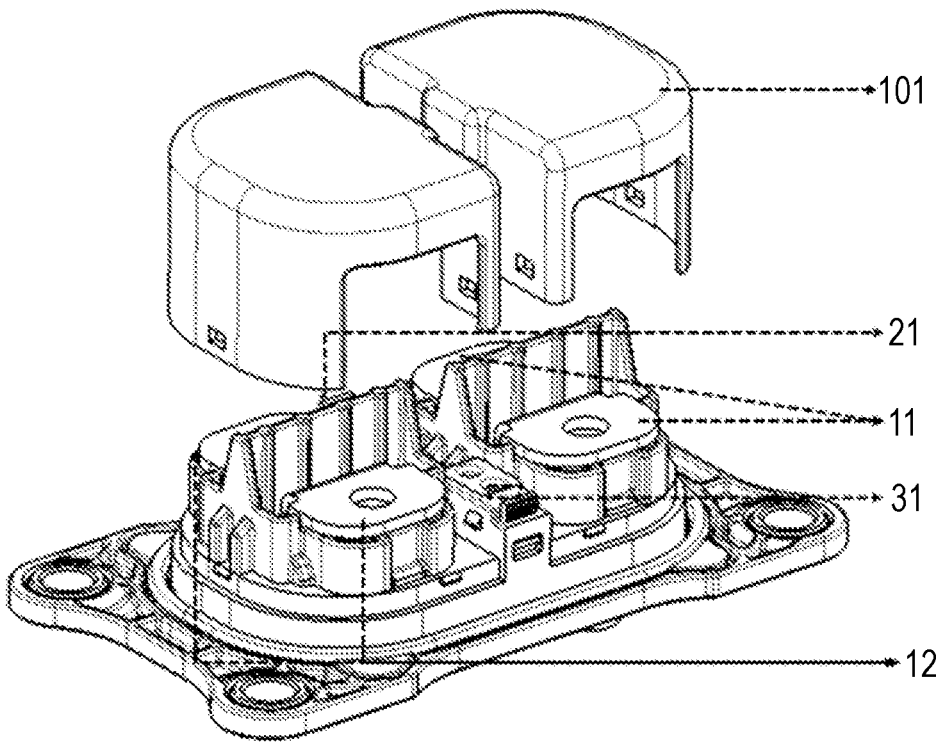
FIG. 6 is a fourth structural diagram of a manual service disconnect in Embodiment 1 of the present disclosure.

In some optional embodiments, referring to FIG. 3 and FIG. 6, the base assembly further includes at least two first low-voltage terminals 31 that are insulated and fixed on the base body 202.

The upper cover assembly further includes two second low-voltage terminals 32 fixed on the upper cover body 102 and corresponding to the two first low-voltage terminals 31, and the two second low-voltage terminals 32 are electrically connected.

When the upper cover assembly is engaged with the base assembly, the two first low-voltage terminals 31 are electrically connected through the two second low-voltage terminals 32 to conduct the high-voltage negative circuit (or high-voltage positive circuit) to form a low-voltage power supply loop (KL30 loop or KL31 loop). The low-voltage power supply loop may directly supply power to controllers such as the battery management system, and may also supply power to switching devices such as relays, which are set on the high-voltage loop.

In this embodiment, when the upper cover assembly is engaged with the base assembly, the manual service conducts the KL30 loop or the KL31 loop to form a low-voltage power supply loop because the low-voltage power supply loop may directly supply power to controllers such as the battery management system. When the upper cover assembly is separated from the base assembly, the low-voltage power supply loop is disconnected, and the controller such as the battery management system sends a high-voltage control signal to the switching device such as the relay, and the switching device such as the control relay is disconnected, thereby making the high-voltage loop of the switching device such as the relay connected in series disconnect, thereby further preventing electric shock and improving safety.

In addition, the low-voltage power supply loop may also supply power to switching devices such as relays. When the upper cover assembly is separated from the base assembly, the low-voltage power supply loop is disconnected, and the switching devices such as relays are also disconnected, so that the high-voltage loop including switching devices such as relays is disconnected, so as to ensure that when the battery management system fails, switching devices such as the relay will also be disconnected, so that the high-voltage loop is disconnected, and the current on the high-voltage loop is zero. When the maintenance personnel unplugs the manual service disconnect, the manual service disconnect is not charged, thereby further preventing maintenance personnel from getting an electric shock and improving safety.

In some optional embodiments, the sum of the lengths of the first interlocking terminal 21 and the second interlocking terminal 22 is less than the sum of the lengths of the first low-voltage terminal 31 and the second low-voltage terminal 32.

In some optional embodiments, the length of each first interlocking terminal 21 is less than the length of each first low-voltage terminal 31, and the length of each second interlocking terminal 22 is equal to the length of each second low-voltage terminal 32, so that the sum of the lengths of the first interlocking terminal 21 and the second interlocking terminal 22 is less than the sum of the lengths of the first low-voltage terminal 31 and the second low-voltage terminal 32. The length difference D between the first interlocking terminal 21 and the first low-voltage terminal 31 may be, but not limited to, greater than or equal to 1 mm.

Figure 5:
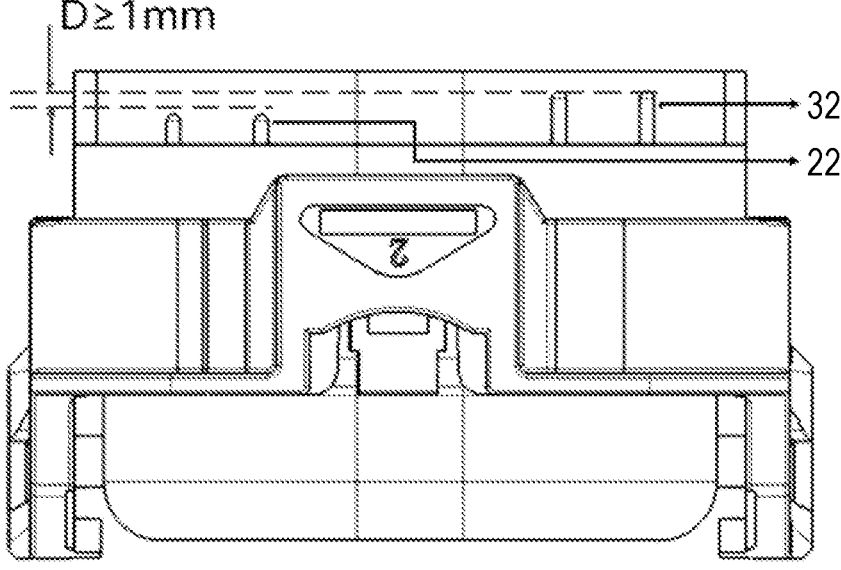
FIG. 5 is a third structural diagram of a manual service disconnect in Embodiment 1 of the present disclosure.

In some optional embodiments, the length of each second interlocking terminal 22 is less than the length of each second low-voltage terminal 32, and the length of each first interlocking terminal 21 is equal to that of each first low-voltage terminal 31, so that the sum of the lengths of the first interlocking terminal 21 and the second interlocking terminal 22 is smaller than the sum of the lengths of the first low-voltage terminal 31 and the second low-voltage terminal 32. Referring to FIG. 5, the length difference D between the second interlocking terminal 22 and the second low-voltage terminal 32 may be, but not limited to, greater than or equal to 1 mm.

In some optional embodiments, the length of each first interlocking terminal 21 is less than the length of each first low-voltage terminal 31, and the length of each second interlocking terminal 22 is less than that of each second low-voltage terminal 32, so that the sum of the lengths of the first interlocking terminal 21 and the second interlocking terminal 22 is less than the sum of the lengths of the second high-voltage terminal 12 and the fourth high-voltage terminal 14.

In this embodiment, when the manual service disconnect is disconnected, that is, when the upper cover assembly is disconnected from the base assembly, the high-voltage interlocking loop may be disconnected first, and then the low-voltage power supply loop is disconnected, that is, controllers such as the battery management system set on the high-voltage interlocking loop will send a high-voltage control signal to disconnect the high-voltage loop, and then the switching devices such as relays or the power supply loop of the battery management system is disconnected. In this way, even if controllers such as the battery management system on the high-voltage interlocking loop fail to send out high-voltage control signals due to failure, it is possible to physically cut off the power to ensure that the battery management system, switching devices such as the relay and other loads on the high-voltage loop are powered off. In addition, the high-voltage interlocking loop is disconnected first, so that controllers such as the battery management system disposed on the high-voltage interlocking loop may send out high-voltage control signals, and first softly control the disconnection of the high-voltage loop to ensure that the current on the high-voltage loop is 0 or almost 0 before the high-voltage loop is disconnected, so that the manual service disconnect, switching devices such as the relay are not charged, so as to avoid arcing when switching devices such as the relay, manual service disconnect, etc. are disconnected, and avoid burning electrical devices such as loads on the high-voltage loop.

The high-voltage interlocking loop may also be used to control switching devices such as relays on the high-voltage loop. When the upper cover assembly of the manual service disconnect is engaged with the base assembly, the first low-voltage terminal 31 and the second low-voltage terminal 32 are in contact prior to the first interlocking terminal 21 and the second interlocking terminal 22, and the low-voltage power supply loop will be connected prior to the high-voltage interlocking loop, so that the high-voltage interlocking loop may detect whether the low-voltage power supply loop is normally powered. When the upper cover assembly and the base assembly of the manual service disconnect are separated, the first low-voltage terminal 31 and the second low-voltage terminal 32 are disconnected later than the first interlocking terminal 21 and the second interlocking terminal 22, the low-voltage power supply loop will be disconnected later than the high-voltage interlocking loop, so that the high-voltage interlocking loop is disconnected first, and the controller such as the battery management system will send a high-voltage control signal to the switching device such as the relay to softly control the disconnection of the high-voltage loop. The current on the high-voltage loop is 0 or almost 0, and the manual service disconnect is not charged, so that it is possible to avoid arcing when the manual service disconnect is disconnected, and prevent the load on the high-voltage loop from being burned. In addition, even if the controller such as the battery management system on the high-voltage interlocking loop fails to send a disconnection control signal, the low-voltage power supply loop may also stop the power supply, force the switching devices such as the relay or the controller such as the battery management system to forcibly power off, so it is possible to prevent maintenance personnel from getting an electric shock, and reinforcing the safety of maintenance personnel.

In some optional embodiments, the sum of the lengths of the first low-voltage terminal 31 and the second low-voltage terminal 32 is less than the sum of the lengths of the first high-voltage terminal 11 and the third high-voltage terminal 13.

The length of each first low-voltage terminal 31 is less than the length of each first high-voltage terminal 11; or the length of each second low-voltage terminal 32 is less than the length of each third high-voltage terminal 13.

In this embodiment, when the upper cover assembly is connected to the base assembly, the high-voltage positive circuit is first connected, and then the low-voltage power supply loop is connected, that is, the high-voltage loop will be connected prior to the low-voltage power supply loop, and the controller such as the battery management system, or switching devices such as relays will be connected to loads such as electrical devices on the high-voltage loop to ensure safety of use of electricity.

When the upper cover assembly is disconnected from the base assembly, the low-voltage power supply loop may be disconnected first, and then the high-voltage positive circuit, that is, the high-voltage loop will be disconnected later than the low-voltage power supply loop, and controllers such as the battery management system, or switching devices such as relays will be disconnected before the load such as the electrical device on the high-voltage loop, so as to avoid the burnout of loads such as the electrical device, prevent arcing when the manual service disconnect is disconnected, and further improve safety.

In some optional embodiments, the sum of the lengths of the first low-voltage terminal 31 and the second low-voltage terminal 32 is less than the sum of the lengths of the second high-voltage terminal 12 and the fourth high-voltage terminal 14.

The length of each first low-voltage terminal 31 is less than the length of each second high-voltage terminal 12; or the length of each second low-voltage terminal 32 is less than the length of each fourth high-voltage terminal 14.

In this embodiment, when the upper cover assembly is connected to the base assembly, the high-voltage negative circuit is first connected, and then the low-voltage power supply loop is connected, that is, the high-voltage loop will be connected prior to the low-voltage power supply loop, and the controller such as the battery management system, or switching devices such as relays will be connected to loads such as electrical devices on the high-voltage loop to ensure safety of use of electricity.

When the upper cover assembly is disconnected from the base assembly, the low-voltage power supply loop may be disconnected first, and then the high-voltage negative circuit, that is, the high-voltage loop will be disconnected later than the low-voltage power supply loop, and controllers such as the battery management system, or switching devices such as relays will be disconnected before loads such as the electrical device on the high-voltage loop, so as to avoid the burnout of loads such as the electrical device, prevent arcing when the manual service disconnect is disconnected, and further improve safety.

In some optional embodiments, the sum of the lengths of the first low-voltage terminal 31 and the second low-voltage terminal 32 is less than the sum of the lengths of the first high-voltage terminal 11 and the third high-voltage terminal 13; and the sum of the lengths of the first low-voltage terminal 31 and the second low-voltage terminal 32 is also less than the sum of the lengths of the second high-voltage terminal 12 and the fourth high-voltage terminal 14.

The length of each first low-voltage terminal 31 is less than the length of each first high-voltage terminal 11; or the length of each second low-voltage terminal 32 is less than the length of each third high-voltage terminal 13; and the length of each first low-voltage terminals 31 is less than the length of each second high-voltage terminal 12; or the length of each second low-voltage terminal 32 is less than the length of each fourth high-voltage terminal 14.

Same as above, that is, the high-voltage loop will be connected prior to the low-voltage power supply loop, and the controllers such as battery management systems, or switching devices such as relays will be connected to loads such as electrical devices on the high-voltage loop; the high-voltage loop will be disconnected later than the low-voltage power supply loop, controllers such as battery management systems, or switching devices such as relays will be disconnected before loads such as electrical devices on the high-voltage loop.

In this embodiment, when the upper cover assembly is connected to the base assembly, the high-voltage negative circuit and the high-voltage positive circuit are connected first, and then the low-voltage power supply loop is connected, controllers such as battery management systems, or switching devices such as relays will be connected later than loads such as electrical devices on the high-voltage loop, thereby ensuring the safety of use of electricity. When the upper cover assembly is disconnected from the base assembly, the low-voltage power supply loop may be disconnected first, and then the high-voltage negative circuit and high-voltage positive circuit may be disconnected, controllers such as battery management systems, or switching devices such as relays will be disconnected before loads such as electrical devices on the high-voltage loop, so as to avoid burnout of electrical devices such as loads, prevent arcing when the manual service disconnect is disconnected, and further improve security.

Embodiment 2

Figure 7:
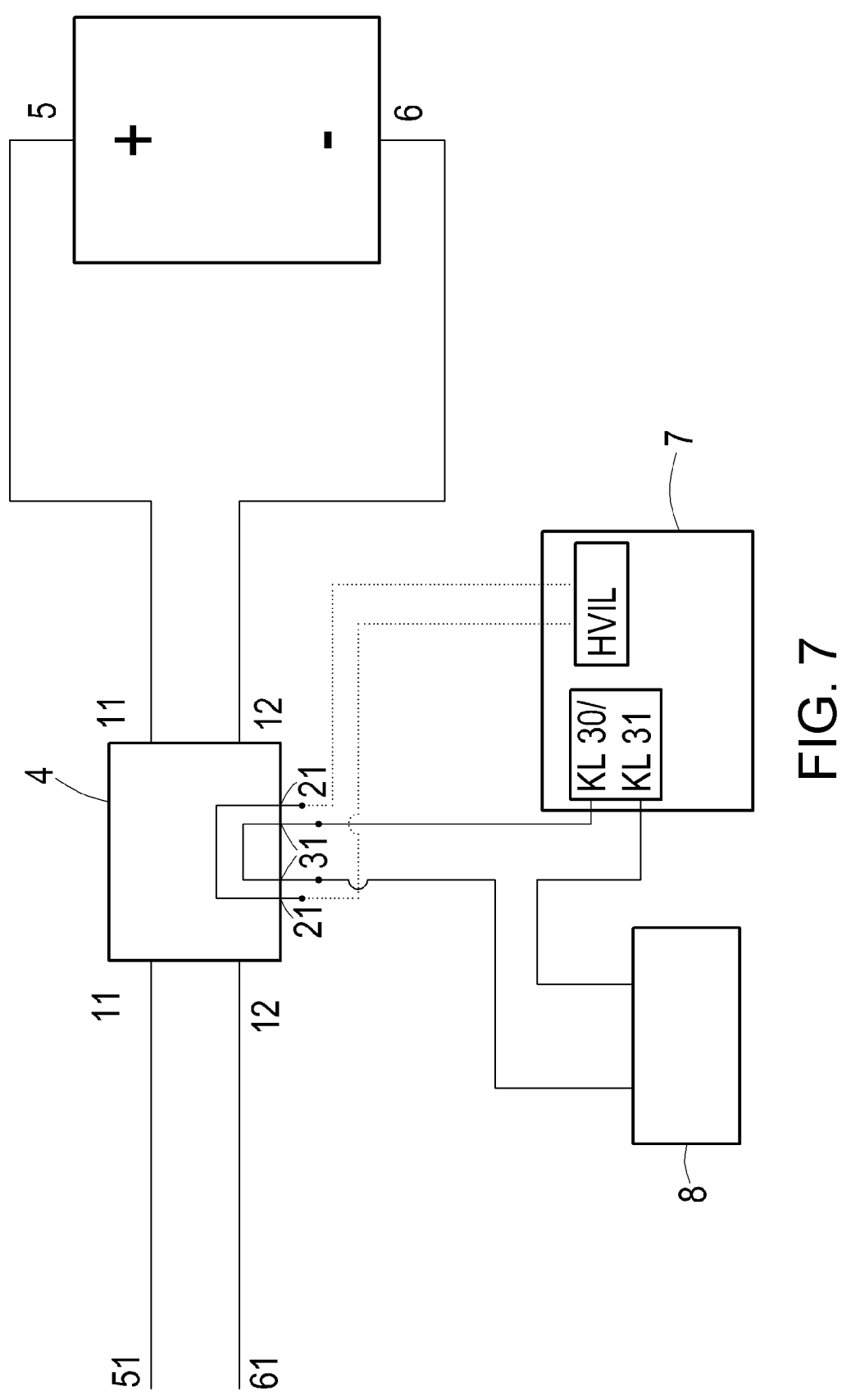
FIG. 7 is a schematic diagram of a protection circuit of a battery pack according to Embodiment 2 of the present disclosure.

This embodiment provides a battery pack. Referring to FIG. 7, the battery pack includes a battery unit, and the battery unit includes a high-voltage positive electrode 5 and a high-voltage negative electrode 6. The high-voltage positive electrode 5 is connected to a high-voltage positive circuit 51, and the high-voltage negative electrode 6 is connected to a high-voltage negative circuit 61.

The battery pack includes a manual service disconnect 4 as in Embodiment 1, one of the two first high-voltage terminals 11 is connected to the high-voltage positive electrode 5, and one of the two second high-voltage terminals 12 is connected to the high-voltage negative electrode 6.

The other of the two first high-voltage terminals 11 is connected to the high-voltage positive circuit 51, and the other of the two second high-voltage terminals 12 is connected to the high-voltage negative circuit 61.

When the upper cover assembly is engaged with the base assembly, the two first high-voltage terminals 11 are electrically connected through the two third high-voltage terminals to conduct the high-voltage positive circuit 51, and the two second high-voltage terminals 12 are electrically connected through the fourth high-voltage terminal to conduct the high-voltage negative circuit 61 to form a high-voltage loop and supply power to the load.

When the upper cover assembly is separated from the base assembly, the high-voltage positive circuit 51 is disconnected and the high-voltage negative circuit 61 is disconnected.

In the battery pack of this embodiment, the manual service disconnect 4 may be connected to the high-voltage positive electrode 5 and the high-voltage negative electrode 6 simultaneously. When the upper cover assembly is disconnected from the base assembly, both the high-voltage positive circuit 51 and the high-voltage negative circuit 61 will be disconnected, which reduces the risk of electric shock of the operator during maintenance and improves the safety of the operator during maintenance.

In some optional implementation manners, referring to FIG. 7, the battery pack further includes a battery management system 7, and the two first interlocking terminals 21 are connected to the battery management system 7.

When the upper cover assembly is engaged with the base assembly, the two first interlocking terminals 21 are electrically connected through the two second interlocking terminals to form a high voltage interlocking loop (HVIL).

When the upper cover assembly is separated from the base assembly, the high voltage interlocking loop is disconnected.

In this embodiment, when the upper cover assembly is engaged with the base assembly, the manual service disconnect 4, along with the controller such as the battery management system 7 and the switching devices such as the relay 8, forms a high-voltage interlocking loop, and when the upper cover assembly is disconnected from the base assembly, the high-voltage interlocking loop is disconnected, and the controllers such as the battery management system 7 disconnect the power supply for the switching devices such as the relay 8, so that the switching devices such as the relay 8 are disconnected, and the high-voltage loop including the switching devices such as the relay 8 is disconnected accordingly, thereby further preventing electric shock and improving safety.

In some optional embodiments, referring to FIG. 7, when the upper cover assembly is engaged with the base assembly, the two first low-voltage terminals 31 are electrically connected through the two second low-voltage terminals to form a low-voltage power supply loop. The low-voltage power supply loop is used to supply power to the switching device to close the switching device; the switching device is arranged on the high-voltage loop.

The low-voltage power supply loop may directly supply power to controllers such as battery management systems, and may also supply power to switching devices such as relays. Switching devices such as relays are set on high-voltage negative circuits, or on high-voltage positive circuits, or on high-voltage negative circuit and high-voltage positive circuit respectively. If the low-voltage power supply loop directly supplies power to controllers such as the battery management system, when the upper cover assembly is separated from the base assembly, the low-voltage power supply loop is disconnected, and controllers such as the battery management system disconnect the power supply for switching devices such as the relay, so that the high-voltage loop including switching devices such as relays is disconnected.

If switching devices such as relays supply power, when the upper cover assembly is separated from the base assembly, the low-voltage power supply loop is disconnected to trigger the disconnection of the high-voltage loop.

The low-voltage power supply loop is a KL30 (positive end loop of the low-voltage power supply loop) loop or a KL31 (negative end loop of the low-voltage power supply loop) loop.

In this embodiment, when the upper cover assembly is connected to the base assembly, the manual service disconnect 4 turns on the KL30 loop or KL31 loop to form a low-voltage power supply loop. If the low-voltage power supply loop directly supplies power to controllers such as the battery management system, when the upper cover assembly is separated from the base assembly, the low-voltage power supply loop is disconnected, and the controller such as the battery management system disconnects the power supply for switching devices such as the relay, so that switching devices such as the relay are disconnected, and the high-voltage loop including switching devices such as the relay is disconnected accordingly. If the low-voltage power supply loop supplies power to the switching devices such as the relay 8, when the upper cover assembly is separated from the base assembly, the low-voltage power supply loop is disconnected, and the switching devices such as the relay 8 are also disconnected, so that the high-voltage loop including the switching devices such as the relay 8 is disconnected to ensure that, when the battery management system fails, switching devices such as relays will also be disconnected to further prevent electric shock and improve safety.

Figure 8:
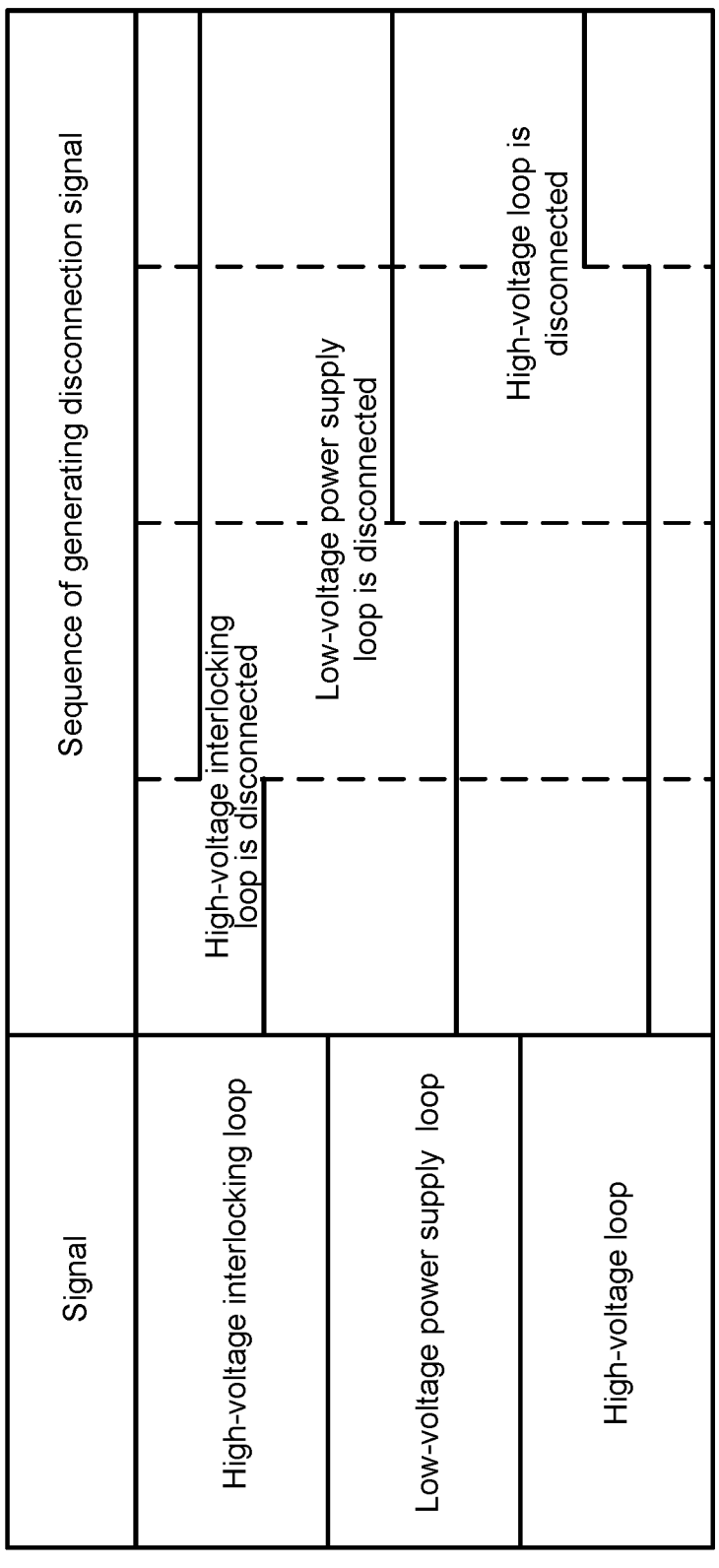
FIG. 8 is a power-on-and-off sequence diagram of the battery pack according to Embodiment 2 of the present disclosure.

FIG. 8 is a power-on-and-off sequence diagram of the battery pack. When the manual service disconnect 4 is disconnected, the battery pack first disconnects the high-voltage interlocking loop, then disconnects the low-voltage power supply loop, and finally disconnects the high-voltage positive circuit 51 and the high-voltage negative circuit 61, so as to further prevent electric shock and improve the safety of the battery pack.

An exemplary manual service disconnect is described below, which includes a base assembly and an upper cover assembly. The base assembly includes a base body, the upper cover assembly includes an upper cover body, and further includes four-stage high-voltage terminals, two-stage interlocking terminals, and two-stage low-voltage terminals. The first high-voltage terminal and the second high-voltage terminal among the four-level high-voltage terminals are fixed on the base body of the manual service disconnect, and the third high-voltage terminal and the fourth high-voltage terminal are fixed on the upper cover body of the manual service disconnect; the first interlocking terminal in the two-stage interlocking terminal is fixed on the base body of the manual service disconnect, and the second interlocking terminal is fixed on the upper cover body of the manual service disconnect; the first low-voltage terminal among the two-stage low-voltage terminals is fixed on the base body of the manual service disconnect, and the second low-voltage terminal is fixed on the upper cover body of the manual service disconnect.

The four-stage high-voltage terminal is connected to the high-voltage loop of the battery pack, the two-stage interlocking terminal is connected to the high-voltage interlocking loop of the battery pack, and the two-stage low-voltage terminal is connected to the low-voltage power supply loop of the battery pack. The sum of the lengths of the first high-voltage terminal and the second high-voltage terminal of the manual service disconnect is greater than the sum of the lengths of the first low-voltage terminal and the second low-voltage terminal, the sum of the lengths of the third high-voltage terminal and the fourth high-voltage terminal is greater than the sum of the lengths of the first low-voltage terminal and the second low-voltage terminal, and the sum of the lengths of the first low-voltage terminal and the second low-voltage terminal is greater than the sum of the lengths of the first interlocking terminal and the second interlocking terminal.

When maintenance is required, the maintenance personnel disconnect the manual service disconnect, that is, separate the upper cover assembly and the base assembly of the manual service disconnect. Because the sum of the lengths of the first high-voltage terminal and the second high-voltage terminal of the manual service disconnect is greater than the sum of lengths of the first low-voltage terminal and the second low-voltage terminal, the sum of lengths of the third high-voltage terminal and the fourth high-voltage terminal are greater than the sum of lengths of the first low-voltage terminal and the second low-voltage terminal, and the sum of lengths of the first low-voltage terminal and the second low-voltage terminal is greater than the sum of lengths of the first interlocking terminal and the second interlocking terminal, the high-voltage interlocking loop, the low-voltage power supply loop, and the high-voltage loop are disconnected in sequence. That is, first, it is set to make the controller such as the battery management system generate a high-voltage control signal so that the high-voltage loop is disconnected, and the current on the high-voltage loop is zero; then the switching devices such as the relay on the low-voltage power supply loop is disconnected, and then the electrical devices such as loads on the high-voltage loop is disconnected to avoid the load from being burned; finally the power supply for electrical devices such as loads on the high-voltage loop is disconnected from soft disconnection to hard disconnection. Firstly, through the high-voltage control signal issued by the controller such as the battery management system on the high-voltage interlocking loop, it is possible to make the current on the high-voltage loop drop to zero, so it is possible to prevent the electrical devices such as loads on the high-voltage loop from burning out, and avoid arcing when the manual service disconnect and the relay are disconnected. In addition, from soft disconnection to hard disconnection, the disconnection of the high-voltage loop is ensured through three steps, so as to prevent maintenance personnel from getting an electric shock when they unplug the manual service disconnect. In this way, even if the high-voltage interlocking loop is disconnected, the controller such as the battery management system fails and cannot control the disconnection of the high-voltage loop, it is possible to directly stop supplying power to the load on the high-voltage loop, or directly disconnect the high-voltage loop.

When the maintenance is over, the maintenance personnel open the manual service disconnect, that is, to engage the upper cover assembly with the base assembly of the manual service. Similarly, because the sum of lengths of the first high-voltage terminal and the second high-voltage terminal of the manual service disconnect is greater than the sum of lengths of the first low-voltage terminal and the low-voltage terminal; the sum of lengths of the third high-voltage terminal and the fourth high-voltage terminal is greater than the sum of lengths of the first low-voltage terminal and the second low-voltage terminal, and the sum of lengths of the first low-voltage terminal and the second low-voltage terminal is greater than the sum of lengths of the first interlocking terminal and the second interlocking terminal, the high-voltage loop, the low-voltage power supply loop and the high-voltage interlocking loop are connected in sequence. That is, firstly, power is supplied to loads such as electrical devices on the high-voltage loop; and then to switching devices such as relays on the low-voltage power supply loop; finally, power is supplied to controllers such as the battery management system to ensure the safety of use of electricity.

Embodiment 3

Figure 9:
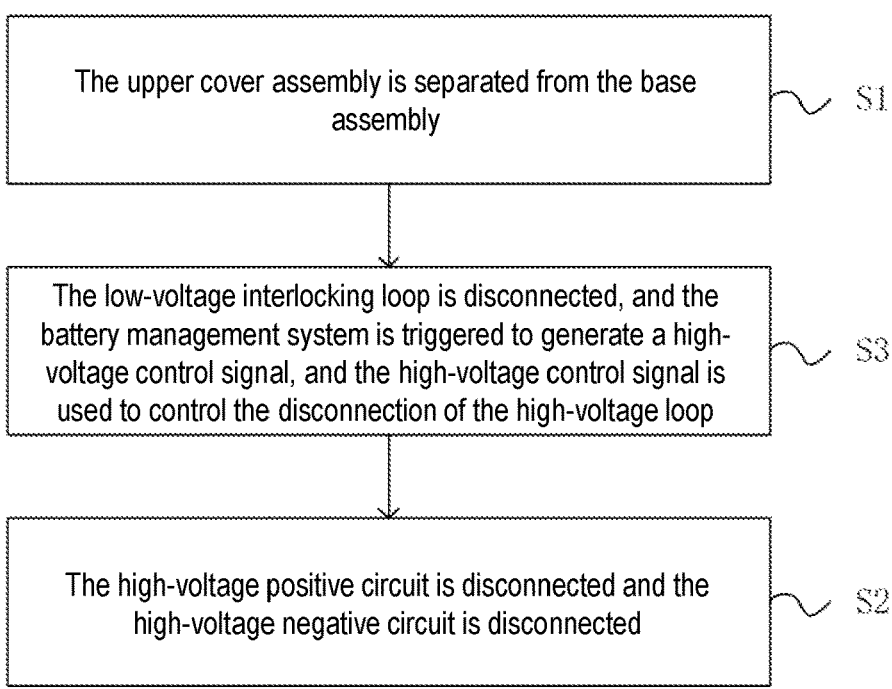
FIG. 9 is a first schematic flow chart of a battery protection method according to Embodiment 3 of the present disclosure.

This embodiment provides a battery protection method, as shown in FIG. 9, which is applied to the battery pack as in Embodiment 2. The battery protection method includes: S1. The upper cover assembly is separated from the base assembly; S2. The high-voltage positive circuit is disconnected and the high-voltage negative circuit is disconnected.

In this embodiment, when the upper cover assembly is disconnected from the base assembly, both the high-voltage positive circuit and the high-voltage negative circuit will be disconnected, which reduces the risk of electric shock for operators during maintenance and improves the safety of operators during maintenance.

In an optional embodiment, referring to FIG. 9, after step S1, before step S2, the method also includes: S3. The high-voltage interlocking loop is disconnected, and the battery management system is triggered to generate a high-voltage control signal, and the high-voltage control signal is used to control the disconnection of the high-voltage loop.

In this embodiment, when the upper cover assembly is disconnected from the base assembly, the high-voltage interlocking loop is disconnected, and the controller such as the battery management system disconnects the power supply for the switching devices such as the relay, so that the switching devices such as the relay are disconnected, so that the high-voltage loop of switching devices such as relays is disconnected, thereby further preventing electric shock and improving safety. In addition, the high-voltage interlocking loop is disconnected first, and then the high-voltage positive circuit and high-voltage negative circuit are disconnected, so as to avoid burning out of electrical devices and avoid arcing, and further improve safety.

Figure 10:
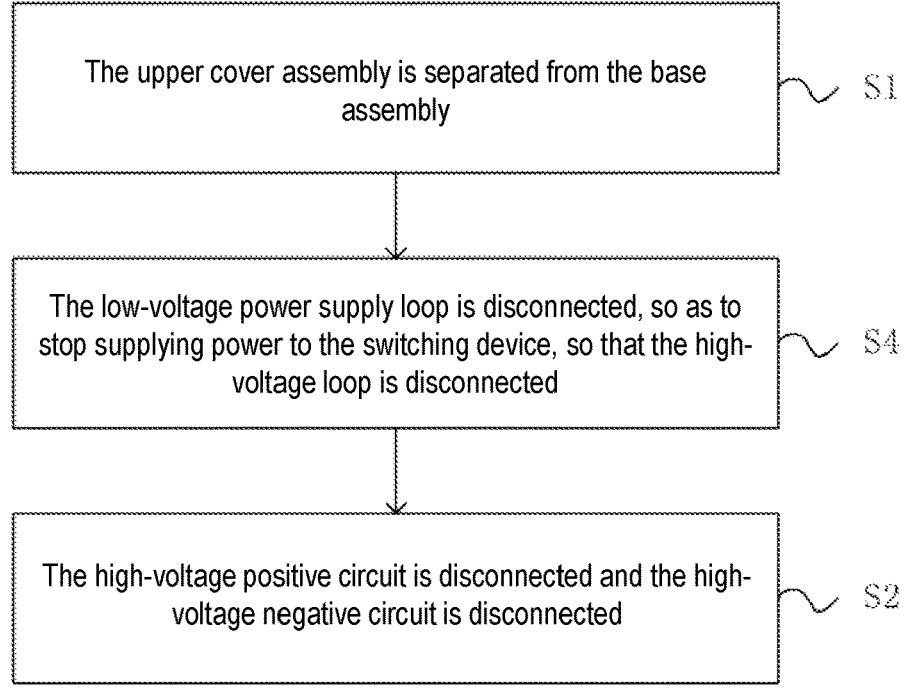
FIG. 10 is a second schematic flow chart of the battery protection method according to Embodiment 3 of the present disclosure.

In some optional implementation, referring to FIG. 10, after step S1, before step S2, the method also includes: S4. The low-voltage power supply loop is disconnected, so as to stop supplying power to the switching device, so that the high-voltage loop is disconnected.

In this embodiment, since the switching device is arranged on the high-voltage loop, the low-voltage power supply loop is disconnected, and the switching device is also disconnected, so that the high-voltage loop including the switching device is disconnected, so that when the battery management system fails, it may be ensured that the switching device will also be disconnected, so as to further prevent electric shock and improve safety.

Figure 11:
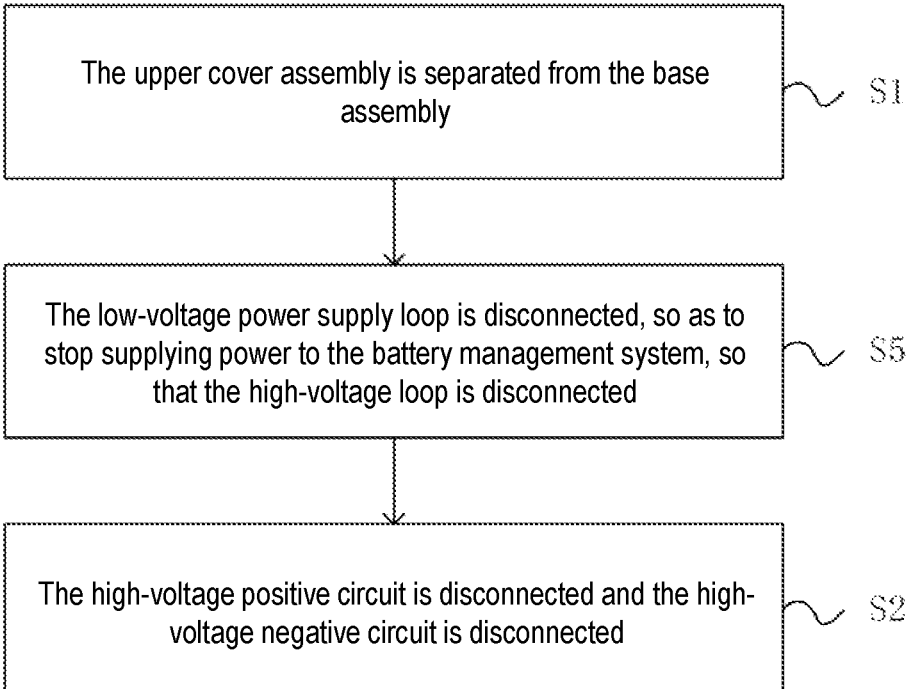
FIG. 11 is a third schematic flow chart of the battery protection method according to Embodiment 3 of the present disclosure.

In some optional implementation, referring to FIG. 11, after step S1, before step S2, the method also includes: S5. The low-voltage power supply loop is disconnected, so as to stop supplying power to the battery management system, so that the high-voltage loop is disconnected.

In this embodiment, the low-voltage power supply loop is disconnected, and the battery management system controls the switching device to be disconnected, so that the high-voltage loop including the switching device is disconnected, thereby further preventing electric shock and improving safety.

In an optional embodiment, after step S1, before step S2, the method also includes: S6. The low-voltage power supply loop is disconnected, so as to stop supplying power to the switching device and the battery management system, so that the high-voltage loop is disconnected.

In this embodiment, the switching device may be disconnected not only by the battery management system, but also by direct power off, so as to ensure that the switching device is disconnected, so that the high-voltage loop containing the switching device is disconnected, thereby further preventing electric shock and improving security.

An exemplary manual service disconnect is described below, which includes a base assembly and an upper cover assembly, the base assembly includes a base body, the upper cover assembly includes an upper cover body, and further includes four-stage high-voltage terminals, two-stage interlocking terminals, and two-stage low-voltage terminals. The first high-voltage terminal and the second high-voltage terminal among the four-level high-voltage terminals are fixed on the base body of the manual service disconnect, and the third high-voltage terminal and the fourth high-voltage terminal are fixed on the upper cover body of the manual service disconnect; the first interlocking terminal in the two-stage interlocking terminal is fixed on the base body of the manual service disconnect, and the second interlocking terminal is fixed on the upper cover body of the manual service disconnect; the first low-voltage terminal among the two-stage low-voltage terminals is fixed on the base body of the manual service disconnect, and the second low-voltage terminal is fixed on the upper cover body of the manual service disconnect.

The four-stage high-voltage terminal is connected to the high-voltage loop of the battery pack, the two-stage interlocking terminal is connected to the high-voltage interlocking loop of the battery pack, and the two-stage low-voltage terminal is connected to the low-voltage power supply loop of the battery pack. The sum of lengths of the first high-voltage terminal and the second high-voltage terminal of the manual service disconnect is greater than the sum of lengths of the first low-voltage terminal and the second low-voltage terminal, and the sum of lengths of the third high-voltage terminal and the fourth high-voltage terminal is greater than the sum of lengths of the first low-voltage terminal and the second low-voltage terminals, and the sum of the lengths of the first low-voltage terminal and the second low-voltage terminal is greater than the sum of the lengths of the first interlocking terminal and the second interlocking terminal.

When maintenance is required, the maintenance personnel disconnect the manual service disconnect, that is, separate the upper cover assembly and the base assembly of the manual service disconnect. Because the sum of the lengths of the first high-voltage terminal and the second high-voltage terminal of the manual service disconnect is greater than the sum of lengths of the first low-voltage terminal and the second low-voltage terminal, the sum of lengths of the third high-voltage terminal and the fourth high-voltage terminal is greater than the sum of lengths of the first low-voltage terminal and the second low-voltage terminal, and the sum of lengths of the first low-voltage terminal and the second low-voltage terminal is greater than the sum of lengths of the first interlocking terminal and the second interlocking terminal, the high-voltage interlocking loop, the low-voltage power supply loop, and the high-voltage loop are disconnected in sequence. That is, the controller such as the battery management system is first triggered to generate a high-voltage control signal to control switching devices such as relays to be disconnected, and then stop supplying power to loads such as electrical devices on the high-voltage loop; then disconnect the power supply of switching devices such as stop relays and controllers such as battery management systems, and then stop supplying power to loads such as electrical devices on the high-voltage loop; finally directly disconnect power supply for loads such as electrical devices on the high-voltage loop. From soft disconnection to hard disconnection, firstly the current on the high-voltage loop is reduced to zero through the high-voltage control signal sent by the controller such as the battery management system on the high-voltage interlocking loop, which may prevent loads such as the electrical devices on the high-voltage loop from burning, avoid manual service disconnect, and avoid arcing when the relay is disconnected. In addition, from soft disconnection to hard disconnection, the disconnection of the high-voltage loop is ensured through three steps, so as to prevent maintenance personnel from getting an electric shock when they unplug the manual service disconnect. In this way, even if the high-voltage interlocking loop is disconnected, the controller such as the battery management system fails and cannot control the disconnection of the high-voltage loop, it is possible to directly stop supplying power to the load on the high-voltage loop, or directly disconnect the high-voltage loop.

When the maintenance is over, the maintenance personnel open the manual service disconnect, that is, the upper cover assembly is joined to the base assembly of the manual service disconnect. Similarly, because the sum of lengths of the first high-voltage terminal and the second high-voltage terminal of the manual service disconnect is greater than the sum of lengths of the first low-voltage terminal and the second low-voltage terminal; the sum of lengths of the third high-voltage terminal and the fourth high-voltage terminal is greater than the sum of lengths of the first low-voltage terminal and the second low-voltage terminal, and the sum of lengths of the first low-voltage terminal and the second low-voltage terminal is greater than the sum of the lengths of the first interlocking terminal and the second interlocking terminal, the high-voltage loop, the low-voltage power supply loop and the high-voltage interlocking loop are connected in sequence. That is, firstly, power is supplied to loads such as electrical devices on the high-voltage loop; then, power is supplied to switching devices such as relays and controllers such as battery management systems; finally, controllers such as the battery management system are set to trigger the signal directly, and control the switching devices such as the relay to open, so as to ensure the normal operation of loads such as the electrical devices on the high-voltage loop and ensure the safety of power consumption.

Although the specific implementation of the present disclosure have been described above, those skilled in the art should understand that this is only an example, and the protection scope of the present disclosure is defined by the appended claims. Those skilled in the art can make various changes or modifications to these embodiments without departing from the principle and essence of the present disclosure, but these changes and modifications all fall within the protection scope of the present disclosure.

What is claimed is:

1. A manual service disconnect, wherein the manual service disconnect comprises a base assembly and an upper cover assembly;

the base assembly comprises a base body, two first high-voltage terminals that are insulated and fixed on the base body, two second high-voltage terminals that are insulated and fixed on the base body, and two first interlocking terminals that are insulated and fixed on the base body;

the upper cover assembly comprises an upper cover body, two third high-voltage terminals fixed on the upper cover body and corresponding to the two first high-voltage terminals, two fourth high-voltage terminals fixed on the upper cover body and corresponding to the two second high-voltage terminals, and two second interlocking terminals fixed on the upper cover body and corresponding to the two first interlocking terminals, the two third high-voltage terminals are electrically connected, the two fourth high-voltage terminals are electrically connected, and the two second interlocking terminals are electrically connected;

when the upper cover assembly is engaged with the base assembly, the two first high-voltage terminals are electrically connected through the two third high-voltage terminals, the two second high-voltage terminals are electrically connected through the two fourth high-voltage terminals, and the two first interlocking terminals are electrically connected through the two second interlocking terminals.

2. The manual service disconnect according to claim 1, wherein a sum of lengths of the first interlocking terminal and the second interlocking terminal is less than at least one of a sum of lengths of the first high-voltage terminal and the third high-voltage terminal and a sum of lengths of the second high-voltage terminal and the fourth high-voltage terminal.

3. The manual service disconnect according to claim 1, wherein the two first high-voltage terminals are parallel to each other, the two second high-voltage terminals are parallel to each other, the two third high-voltage terminals are parallel to each other, and the two fourth high-voltage terminals are parallel to each other.

4. The manual service disconnect according to claim 1, wherein the two first interlocking terminals are parallel to each other, and the two second interlocking terminals are parallel to each other.

5. The manual service disconnect according to claim 3, wherein one of the two first high-voltage terminals and one of the two second high-voltage terminals are parallel to each other; the other of the two first high-voltage terminals and the other of the two second high-voltage terminals are parallel to each other.

6. The manual service disconnect according to claim 3, wherein one of the two third high-voltage terminals and one of the two fourth high-voltage terminals are parallel to each other; the other of the two third high-voltage terminals and the other of the two fourth high-voltage terminals are parallel to each other.

7. The manual service disconnect according to claim 1, wherein the base assembly further comprises at least two first low-voltage terminals that are insulated and fixed on the base body;

the upper cover assembly further comprises two second low-voltage terminals fixed on the upper cover body and corresponding to the two first low-voltage terminals, and the two second low-voltage terminals are electrically connected;

when the upper cover assembly is engaged with the base assembly, the two first low-voltage terminals are electrically connected through the two second low-voltage terminals.

8. The manual service disconnect according to claim 7, wherein a sum of the lengths of the first interlocking terminal and the second interlocking terminal is less than a sum of lengths of the first low-voltage terminal and the second low-voltage terminal.

9. The manual service disconnect according to claim 7, wherein a sum of the lengths of the first low-voltage terminal and the second low-voltage terminal is less than at least one of a sum of the lengths of the first high-voltage terminal and the third high-voltage terminal and a sum of the lengths of the second high-voltage terminal and the fourth high-voltage terminal.

10. A battery pack, wherein the battery pack comprises a battery unit, the battery unit comprises a high-voltage positive electrode and a high-voltage negative electrode, the high-voltage positive electrode is connected to a high-voltage positive circuit, and the high-voltage negative electrode is connected to a high-voltage negative circuit;

the battery pack comprises the manual service disconnect according to claim 1, wherein the one of the two first high-voltage terminals is connected to the high-voltage positive electrode, and the one of the two second high-voltage terminals is connected to the high-voltage negative electrode;

when the upper cover assembly is engaged with the base assembly, the two first high-voltage terminals are electrically connected through the two third high-voltage terminals to conduct the high-voltage positive circuit, and the two second high-voltage terminals are electrically connected through the two fourth high-voltage terminals to conduct the high-voltage negative circuit to form a high-voltage loop;

when the upper cover assembly is separated from the base assembly, the high-voltage positive circuit is disconnected and the high-voltage negative circuit is disconnected.

11. The battery pack according to claim 10, wherein the battery pack further comprises a battery management system, and the two first interlocking terminals are connected to the battery management system;

when the upper cover assembly is engaged with the base assembly, the two first interlocking terminals are electrically connected through the two second interlocking terminals to form a high-voltage interlocking loop;

when the upper cover assembly is separated from the base assembly, the high-voltage interlocking loop is disconnected.

12. The battery pack according to claim 10, wherein when the upper cover assembly is engaged with the base assembly, the two first low-voltage terminals are electrically connected through the two second low-voltage terminals to form a low-voltage power supply loop; the low-voltage power supply loop is configured to supply power to a switching device to close the switching device; the switching device is disposed on the high-voltage loop;

when the upper cover assembly is separated from the base assembly, the low-voltage power supply loop is disconnected to trigger disconnection of the high-voltage loop.

13. The battery pack according to claim 12, wherein the low-voltage power supply loop is a KL30 loop or a KL31 loop.

14. A battery protection method, which is applied to the battery pack according to claim 10, and the battery protection method comprises:

when the upper cover assembly is separated from the base assembly, the high-voltage positive circuit is disconnected and the high-voltage negative circuit is disconnected.

15. The battery protection method according to claim 14, wherein following the step of separating the upper cover assembly from the base assembly, before the step of disconnecting the high-voltage positive circuit and disconnecting the high-voltage negative circuit, the method further comprises:

a high-voltage interlocking loop is disconnected, and a battery management system is triggered to generate a high-voltage control signal, and the high-voltage control signal is provided to control disconnection of the high-voltage loop.

16. The battery protection method according to claim 14, wherein following the step of separating the upper cover assembly from the base assembly, and before the step of disconnecting the high-voltage positive circuit and disconnecting the high-voltage negative circuit, the method further comprises:

a low-voltage power supply loop is disconnected to stop supplying power to at least one of a switching device and a battery management system so as to disconnect the high-voltage loop.

* * * * *